United States Patent Office 2,800,414
Patented July 23, 1957

2,800,414

LOW-TEMPERATURE MATURING VITRIFIABLE ENAMELING FRITS

Norman H. Stradley, St. Paul, and George C. Hann, Minneapolis, Minn., assignors to Minnesota Mining & Manufacturing Company, St. Paul, Minn., a corporation of Delaware No Drawing. Application November 26, 1954, Serial No. 471,495

12 Claims. (Cl. 106—48)

This invention relates to low-temperature maturing, vitrifiable, phosphate-base enameling frits suitable for application to aluminum-type surfaces, and more particularly, to such enameling frits having, in the fused state, a high resistance to chemical attack.

Aluminum-type surfaces such as the surfaces of articles made of aluminum or low melting alloys thereof present a rather serious problem from the standpoint of protectively coating the same against the deteriorating effect of chemical agents. High-temperature maturing enameling frits, which, in the fused state, usually possess high resistance to chemical attack, cannot be used on such surfaces because aluminum and alloys thereof melt or lose their tensile strength at rather low temperatures, i. e., temperatures only somewhat above 600° C., which temperatures are much below the fusion point of such high-temperature maturing enamels. Known enameling frits which mature, that is fuse, at temperatures below the softening point of aluminum-type materials suffer certain defects the nature of which varies depending upon the particular composition. For example, while lead oxide has been employed as a constituent in enameling frits to gain low-temperature maturing properties, it is undesirable as a constituent in these frits for the reason of its toxicity. Because of the foregoing and for other reasons, e. g., difficult color control, poor abrasion resistance, etc. low-temperature maturing enameling frits containing lead oxide have experienced only limited use.

There has been developed also what is now known as silicate-glass enameling frits containing boric oxide and a great quantity of alkali oxides. These frits, however, have never possessed both suitably low-temperature maturing properties and adequately high resistance to chemical attack in the fused state.

Phosphate-base enameling frits have generally been recognized as possessors of low-temperature maturing properties. Unfortunately, they also generally possess poor resistance to attack by chemicals, particularly acids. Alumina has in the past been used in rather large quantities in these enameling frits in the belief that it improved to some extent their chemical resistivity in the fused state.

This invention, however, provides a non-toxic, phosphate-base enameling frit having, in the fused state, a chemical durability or resistivity which is outstandingly superior to the resistivity exhibited by prior art low-temperature maturing enameling frits, including those prior art phosphate-base frits which have contained rather large quantities of alumina. Very little alumina is required or desired in the enameling frits hereof. Enameling slips made from the enameling frits of this invention mature at temperatures below 600° C. and, in the case of slips made from preferred enameling frit formulations, below 560° C. Fused porcelain enamels produced with the enameling frits hereof are abrasion-resistant, glossy, and free of surface defects. Without opacifiers and coloring agents, these fused enamels are transparent. The transparency of our enamels without coloring agents or opacifiers is particularly surprising in view of the presence in the enameling frit compositions of certain highly refractory oxides such as those of titanium and zirconium which have previously been used as opacifiers because of their lack of glassforming tendencies. Enamels formed from the frits hereof have coefficients of thermal expansion, between 50 and 350° C., greater than about $12 \times 10^{-6}$, which is a suitable coefficient of thermal expansion for enamels designed for aluminum-type materials. Enamels formed from preferred enameling frit compositions hereof, however, have coefficients of thermal expansion, between 50 and 350° C., greater than about $13 \times 10^{-6}$.

The above and other advantages of the enameling frits of this invention are obtained, primarily, by employing a particular balance of particular inorganic constituents in the making of the enameling frits in accordance with principles which are set forth in detail below.

To illustrate the balance of inorganic constituents required in our enameling frits in order to obtain the advantages of this invention, cationic mol percentages are used. According to this method of designating relative proportions, any given oxide unit is considered as having one metal atom as the cation. An enameling frit composition as a whole is considered as being one cationic mol in value. Individual elements in presumptively oxide form are present in a defined percentage of the cationic mol. If individual elements are present in our compositions in presumptively fluoride form, the cationic mol percent of the element is still calculated on an oxygen equivalent basis. Broadly, our compositions are of the following main groups of constituents, with cationic mol percentage proportions as noted:

|  | Cationic mol percent |
|---|---|
| Group A—Refractory glassformers | 10–25 |
| Group B—Non-refractory glassmakers of which at least about one-half is $PO_{2.5}$, said total amount of $PO_{2.5}$ being at least as great as the total of all the components of Group A | 35–50 |
| Group C—Alkali and alkaline earth fluxes | 25–55 |

Within each of the above main groups are individual inorganic constituents which fall within the approximate cationic mol percentage ranges as follows:

TABLE A

Group A

| | Percent |
|---|---|
| $ZrO_2$ | .5 to 5 |
| $TiO_2$ | 0 to 9 |
| $ZrO_2 + TiO_2$ | 3 to 10 |
| $SiO_2$ | 0 to 5 |
| $AlO_{1.5}$ | 4 to 16 |

Group B

| | |
|---|---|
| $BO_{1.5}$ | 13 to 25 |
| $PO_{2.5}$ | 15 to 30 |

Group C

| | |
|---|---|
| $LiO_{0.5}$ | 7 to 20 |
| $KO_{0.5}$ | 3 to 15 |
| $NaO_{0.5}$ | 0 to 20 |
| $CaO$ | 0 to 10 |
| $BaO$ | 0 to 10 |
| $CaO + BaO$ | 0 to 15 |

As a matter of convenience, and in accordance with standard practice in this art, we represent our cationic constituents as combined with split atoms of oxygen. It is, of course, realized that the form of these constituents in the enameling frit and in the enamels is not definitely known.

The total content of zirconium and titanium oxide in group A must range from 3 to 10 cationic mol percent of the total enameling composition. Titanium oxide may be omitted from any particular composition, but if it is omitted zirconium oxide must be present within the required range, i. e., between approximately 3 to 5 cationic mol percent. Contrary to what would be expected from the prior art, we believe that both zirconium and titanium in our frit compositions behave as glassformers. We believe that the glass network of which they are a part is largely responsible for the exceptional chemical resistivity of our enamels. The oxides of zirconium, titanium, silicon and aluminum are classed together because we have found them to possess related refractory glassforming characteristics. Higher amounts of any one, or the total of all, group A oxides upsets the balance of properties of our compositions and increases the temperature at which fusion of the resulting frit takes place.

Group B constituents are known to provide low-temperature glassforming characteristics but have been considered poor constituents for enamels for which a high chemical resistivity is desired. In some cases, enamels for aluminum-type materials have contained a much lower amount of boric oxide than specified for our compositions. Adding a low amount as used in prior art compositions has imparted low-temperature maturing properties to a composition, but, a larger amount of boric oxide such as used in our compositions has been avoided inasmuch as it has caused a severe loss of chemical resistivity and of desired thermal expansion characteristics. In our balanced compositions, a relatively high percentage of boric oxide is not only easily tolerated by the remaining constituents of the formulation but, in fact, functions admirably to lower the maturing temperature of the enameling frit, and surprisingly, leaves relatively unaffected the high chemical resistivity and desired thermal expansion characteristics of the matured enamel. We believe that the phosphorus oxide in our compositions acts with the ingredients of group A, particularly titanium and zirconium oxides to form an extremely stable network which is largely responsibe for the unusual chemical resistivity of the matured enamel.

Group C constituents presumably function as modifiers to the glass networks of our enamels in that they do not apparently enter into the networks as integral parts thereof. Lithium strongly enhances low-temperature maturing characteristics of our compositions, and in addition, does not adversely affect the hardness and durability of porcelain enamels formed therefrom. When present within the ranges specified, group C constituents enhance the tendency toward low-temperature maturing and do not unduly interfere with other desired properties of the enameling frit. Outside the ranges specified, chemical resistivity and thermal expansion characteristics of the matured enamel are severely affected.

Although not specified in the above table, we prefer to incorporate a small amount of fluorine in our compositions to further improve their low-temperature maturing properties. Fluorine (as $F_2^=$) may be incorporated in the composition as a substitute for any of the oxides thereof in an amount up to, but not in excess of, the equivalent of 10 mol percent of oxygen (as $O^=$). In other words, the amount of fluorine required to replace all the oxygen present in 20 cationic mol percent of lithium oxide would be the equivalent of 10 mol percent of oxygen.

Other inorganic cationic constituents than those specified above, and those hereinafter specified as adherence-promoting oxides, may be present in our enameling frit compositions in an amount preferably not in excess of 5 cationic mol percent of the total composition. In some frit compositions, the required balance of properties is not upset with a foreign cationic content as high as 10 cationic mol percent of the composition, but such a high content of foreign cations is generally to be avoided. Higher percentages of additional inorganic materials shift the particular ambient conditions attained during the preparation of a frit and cause a loss of the peculiar structural characteristics of our matured enamels as well as the required properties exhibited thereby.

In the following table, we set forth four of our enameling frit compositions. Amounts are in cationic mol percent.

TABLE I

| | 1 | 2 | 3 | 4 |
|---|---|---|---|---|
| Group A: | | | | |
| $ZrO_2$ | 4 | 3.5 | 2 | 1 |
| $TiO_2$ | 6 | | 3 | 5.9 |
| $AlO_{1.5}$ | 10 | 13.0 | 10 | 15.8 |
| $AlF_3$ | | | 4 | |
| Group B: | | | | |
| $BO_{1.5}$ | 18 | 15 | 16 | 17.8 |
| $PO_{2.5}$ | 22 | 25 | 25 | 27.4 |
| Group C: | | | | |
| $LiO_{0.5}$ | 15 | 14 | 20 | 7.5 |
| $KO_{0.5}$ | 10 | 10 | 15 | 8.6 |
| $NaO_{0.5}$ | 10 | 4 | | 8.0 |
| $BaO$ | | 3 | 2 | |
| $NaF$ | 3 | 12.5 | | 8.0 |
| $CaF_2$ | 2 | | 3 | |
| Weight loss by Sweo acid test [1] | .05 | .24 | .18 | .12 |
| Weight loss by Sweo alkali test [1] | .24 | .22 | .20 | .31 |
| Maturing Temperature, °C | 570 | 540 | 550 | 570 |
| Coefficient of Expansion | $14.3 \times 10^{-6}$ | $14.6 \times 10^{-6}$ | $12 \times 10^{-6}$ | $14.5 \times 10^{-6}$ |

[1] Tests described below.

The foregoing and other enameling frit compositions of this invention may be prepared in the following manner. Compounds such as aluminum hydrate, zirconium oxide, sodium titanate, boric acid, aluminum meta phosphate, potassium meta phosphate, lithium carbonate, sodium fluoride, and the like, are provided in the amounts necessary to give in frit form the calculated cationic mol percent analysis specified above. These materials are mixed together, melted to a homogeneous state, usually accomplished at temperatures of approximately 1100° C. or slightly above, and the molten glass is quickly chilled such as by pouring it into a water bath. The sudden chilling causes the glass-like mass to fracture into small pieces. These small pieces are recovered and dried to provide the enameling frit.

After our formulations are prepared in glassy frit form, an enamel slip may be prepared, preferably by mixing the frit in a ball mill with suspending and/or binding agents, e. g., sodium silicate, sodium nitrite, etc., and water. Opacifiers, such as zirconium, antimony and titanium compounds, etc., up to 15 added percent by weight, and inorganic coloring pigments such as cobalt, cadmium, chromium and selenium compounds, etc., up to 10 added percent by weight, may be included as modifiers, if desired, in the above mill formula. It should be noted also that inorganic pastel staining compositions for porcelain enamels may be used in place of, or in addition to, other coloring agents. For example, a blue-green pastel inorganic staining composition formed from oxides of cobalt, silicon, aluminum, chromium and zinc is suitable to add to the slip to impart a pastel stain to the resulting enamel. Other pastel inorganic staining compositions, however, are equally suitable. Very delicate shades and hues are possible in enamels made from our enameling frits. In addition, enamels possessing extreme whiteness, known in the trade as "appliance white," are easily obtained. The slip mixture is ground to a very fine particle size and generally exhibits a specific gravity and pH value in the range of 1.70 to 1.85 and 3.0 to 9.0 respectively.

The metal panel to be enameled is cleaned to remove all traces of grease and foreign matter. After it has dried, it is coated with the slip by spraying, dipping, or the like. The specimen is then dried, e. g., at approximately 115° C., to remove all traces of free water, and thereafter, fired to a temperature below 600° C. to fuse and vitrify the coating into a continuous glassy sheet. Firing is accomplished according to well-known procedures. Temperatures as low as 520° C. may be employed with the compositions of this invention although it will usually be found desirable to employ temperatures around or above 540° C. but below 600° C.

Enameling frit compositions set forth above, while suitable for direct application upon aluminum-type panels, have exhibited a somewhat less tenacious adherence to the base panel than might be satisfactory under some conditions of use, particularly under conditions of severe exposure such as outdoor weathering. This severe exposure may cause a "water-spalling" phenomenon which reduces the adherence of the coating to an aluminum or aluminum alloy panel. To avoid this we have found that it is desirable to use on aluminum-type surfaces, a base or ground enamel coating formed from a frit of this invention containing a very small amount of one or more oxides which may be termed adherence-promoting oxides.

Some adherence-promoting oxides are $FeO_{1.5}$, $CrO_{1.5}$, $SbO_{1.5}$, $CoO_{1.5}$, $TlO_{1.5}$, $BiO_{1.5}$, $CdO$, $NiO$, $CuO$, and $AgO_{0.5}$. Any one of these oxides may be present in the frit up to approximately 5 cationic mole percent but the total amount of these oxides in the frit should not exceed approximately 7 cationic mol percent of the frit composition. Highter amounts tend to upset the balance of properties which are required in enameling frits for aluminum-type materials.

It should be noted incidentally that adherence-promoting oxides are unnecessary constituents in formulations designed for use as outer surface enameling coats.

Table II gives five examples of compositions of our invention containing adherence-promoting oxides. Adherence-promoting oxides may be omitted from any formulation if the function thereof is not required. Cationic mol percentage amounts are shown in the table.

of hydrochloric acid and 40 milliliters of water. Other suspending and/or binding agents may be used in addition to, or in substitution for, those mentioned. The foregoing slip mixtures is ground in the mill until the residue after screening on a 200 mesh screen is less than 2 grams per 100 cc. of slip. The slip at this point is ready for application by spraying or dipping. An aluminum-type panel is cleaned by washing with gasoline, dried, and sprayed with a coating of the slip. After removal of water from the coated slip by drying at about 115° C., the piece is fired at 540° C. for five minutes. The resulting coating is free of surface defects and possesses a high gloss, high degree of adherence, and a light bluish-green color.

For the purpose of further illustration, but not by way of limitation, Tables III and IV are included to show the relationship between cationic mol percent and weight percent, respectively of the constituents of two preferred enameling frit compositions of our invention.

TABLE III

[Proportions are in mol percent.]

| | 10 | 11 |
|---|---|---|
| Group A: | | |
| $ZrO_2$ | 1.2 | 3 |
| $TiO_2$ | 5.7 | 6 |
| $AlO_{1.5}$ | 11.4 | 11.6 |
| Group B: | | |
| $BO_{1.5}$ | 19.8 | 18.4 |
| $PO_{2.5}$ | 25 | 23.5 |
| Group C: | | |
| $LiO_{0.5}$ | 15 | 15 |
| $KO_{0.5}$ | 10 | 9 |
| $NaF$ | 11.9 | 13.5 |

TABLE II

| | 5 | 6 | 7 | 8 | 9 |
|---|---|---|---|---|---|
| Group A: | | | | | |
| $ZrO_2$ | 3 | 1.2 | 3 | 3 | 5 |
| $TiO_2$ | 5 | 3.2 | 3 | 3 | 4 |
| $SiO_2$ | 3 | | | | |
| $AlO_{1.5}$ | 5 | 13.9 | 11.6 | 12 | 10 |
| Group B: | | | | | |
| $BO_{1.5}$ | 18 | 19.8 | 18.4 | 14 | 18 |
| $PO_{2.5}$ | 23 | 25 | 23.5 | 23.5 | 23.5 |
| Group C: | | | | | |
| $LiO_{0.5}$ | 10 | 15 | 14 | 14 | 12 |
| $KO_{0.5}$ | 8 | 7 | 7 | 7 | 7 |
| $NaO_{0.5}$ | | | | 4 | |
| $BaO$ | | | | | |
| $CaO$ | 6 | | 3 | 3 | 5 |
| $NaF$ | 5 | | | | |
| | 11 | 11.9 | 12 | 12 | 11 |
| Adherence-Promoting Oxides: | | | | | |
| $SbO_{1.5}$ | | | | | |
| $CuO$ | 1 | | 1.5 | 1.5 | 1.5 |
| $CdO$ | 2 | 3 | 3 | 3 | 3 |
| Weight loss by Sweo acid test [1] | .07 | .16 | .08 | .09 | .09 |
| Weight loss by Sweo alkali test [1] | .05 | .35 | .17 | .16 | .11 |
| Maturing Temperature, °C | 580 | 540 | 550 | 530 | 560 |
| Coefficient of Expansion | $13.4 \times 10^{-6}$ | $13.5 \times 10^{-6}$ | $13.2 \times 10^{-6}$ | $13.5 \times 10^{-6}$ | $13.1 \times 10^{-6}$ |

[1] Tests described below.

A suitable batch formulation for making composition 6 is one composed of 10.2% aluminum hydrate, 2.5% zirconia, 4.3% titania, 20.7% boric acid, 26.5% aluminum metaphosphate, 13.9% potassium metaphosphate, 9.4% lithium carbonate, 8.4% sodium fluoride, and 4.0% black copper oxide, by weight.

The above materials are mixed uniformly and melted in a refractory lined vessel, such as an alumina-silicate vessel at a furnace temperature of approximately 1100° C. The mass is heated until it completely melts down to a homogeneous fluid glass. The molten mass is then water quenched, and the resulting glassy enameling frit is dried.

The frit may be prepared as an enameling slip by mixing in a ball mill, 100 grams of frit, 2 grams of sodium silicate ($Na_2O:SiO_2$ ratio of 1:3.22 by weight), .25 gram of sodium nitrite, 2 milliliters of a one normal solution

TABLE IV

[Proportions are in percent by weight.]

| | 10 | 11 |
|---|---|---|
| Group A: | | |
| $ZrO_2$ | 3.1 | 7.5 |
| $TiO_2$ | 9.4 | 9.7 |
| $AlO_{1.5}$ | 12.0 | 11.8 |
| Group B: | | |
| $BO_{1.5}$ | 14.2 | 12.9 |
| $PO_{2.5}$ | 36.6 | 33.6 |
| Group C: | | |
| $LiO_{0.5}$ | 4.7 | 4.5 |
| $KO_{0.5}$ | 9.7 | 8.5 |
| $NaF$ | 10.3 | 11.5 |
| Weight loss by Sweo Acid Test [1] | .10 | .06 |
| Weight loss by Sweo Alkali Test [1] | .32 | .26 |
| Maturing Temperature, °C | 535 | 540 |
| Coefficient of Expansion | $15.1 \times 10^{-6}$ | $14.5 \times 10^{-6}$ |

[1] Tests described below.

When either composition 10 or 11, without pigments or opacifiers, is applied and fired at approximately 536 to 540° F. for 3 to 5 minutes, durable, hard, glossy coatings result which are transparent. We believe this transparency of enamels made from our enameling frits is surprising in view of their high content of zirconium dioxide and titanium dioxide. If colored coatings are desired, inorganic coloring oxides, inorganic pastel coloring agents, opacifiers, etc., may be included in the mill formula.

Despite the low temperatures at which our enameling frits mature, the resulting porcelain enamels are extremely resistant to the action of chemicals. The chemical resistivity of an enamel may be determined by measuring its resistivity to acids and alkalies. To measure acid resistivity we expose an enameled specimen panel to a boiling solution of 6% citric acid, by weight, for two and one-half hours according to the test procedure outlined by B. J. Sweo in an article entitled, "Correlation of Weather Resistance of Porcelain Enamels with Chemical Test Data" in the Journal of American Ceramic Society, volume 32, No. 11, November 1949, pages 356–359. By this test all our low-temperature maturing enamels have a weight loss of less than .3 gram per square inch. To measure alkali resistivity we expose an enameled specimen panel to a boiling solution of 5% hydrated sodium pyrophosphate ($Na_4P_2O_7.10H_2$), by weight, for two and one-half hours, according to the test procedure outlined in the aforementioned article by B. J. Sweo. In this test all our low-temperature maturing enamels have a weight loss of less than .4 gram per square inch. We do not know of any other phosphate base enamels for aluminum-type materials which have such a desirable combination of acid and alkali resistivity. The combination of properties possessed by our enamels, particularly that property of acid resistivity in conjunction with the other properties renders our enamels especially suitable for use on cooking utensils or on surfaces exposed to severe weathering.

While enameling frits having constituent analyses within the broad cationic mol percentage ranges set forth for groups A, B and C above exhibit desirable properties according to this invention, we have found that a more limited cationic mol percent range for groups A, B and C results in enameling frits having preferred combinations of desired properties. This more limited preferred range is as follows:

Cationic mol percent

Group A—Refractory glassformers_____ 15 to 22
Group B—Nonrefractory glassformers of which
  at least about one-half $PO_{2.5}$, said total
  amount of $PO_{2.5}$ being at least as great as the
  total of all the components of group A_____ 36 to 46
Group C—Alkali and alkaline earth fluxes_____ 30 to 45

Within each of the above main groups are individual inorganic constituents in our preferred compositions which fall within the approximate cationic mol percentage ranges as follows:

TABLE B

*Group A*

| | |
|---|---|
| $ZrO_2$ | 1 to 5 |
| $TiO_2$ | 1 to 8 |
| $ZrO_2+TiO_2$ | 4.5 to 9 |
| $SiO_2$ | 0 to 3 |
| $AlO_{1.5}$ | 9 to 14 |

*Group B*

| | |
|---|---|
| $BO_{1.5}$ | 14 to 21 |
| $PO_{2.5}$ | 18 to 28 |

*Group C*

| | |
|---|---|
| $LiO_{0.5}$ | 10 to 15 |
| $KO_{0.5}$ | 5 to 12 |
| $NaO_{0.5}$ | 5 to 17 |
| $CaO$ | 0 to 7 |
| $BaO$ | 0 to 7 |
| $CaO+BaO$ | 0 to 10 |

The following four enameling frit compositions, together with compositions 7 through 11 inclusive, are preferred enameling frit compositions according to this invention, the compositions being indicated in cationic mol percent:

TABLE V

| | 12 | 13 | 14 | 15 |
|---|---|---|---|---|
| Group A: | | | | |
| $ZrO_2$ | 4 | 3 | 3 | 3.1 |
| $TiO_2$ | 5 | 4 | 5 | 3.1 |
| $AlO_{1.5}$ | 11 | 13 | 10 | 12.6 |
| Group B: | | | | |
| $BO_{1.5}$ | 18 | 18 | 20 | 14.7 |
| $PO_{2.5}$ | 23 | 23 | 23 | 24.6 |
| Group C: | | | | |
| $LiO_{0.5}$ | 15 | 15 | 15 | 14.7 |
| $KO_{0.5}$ | 10 | 10 | 10 | 7.3 |
| $NaO_{0.5}$ | | | | 4.2 |
| $BaO$ | | | | 3.1 |
| $NaF$ | 13 | 13 | 13 | 12.6 |
| $CaF_2$ | 1 | 1 | 1 | |
| Weight Loss by Sweo Acid Test | .06 | .10 | .08 | .07 |
| Weight Loss by Sweo Alkali Test | .26 | .28 | .26 | .13 |
| Maturing Temperature, °C. | 550 | 535 | 550 | 530 |
| Coefficient of Expansion | $13.8\times10^{-6}$ | $14.2\times10^{-6}$ | $13.4\times10^{-6}$ | $14.5\times10^{-6}$ |

Preferred compositions mature at temperatures below 560° C., have coefficients of thermal expansion greater than $13\times10^{-6}$ between 50 and 350° C., and in addition have an acid resistance as determined by the Sweo test, giving a weight loss of less than 0.2 gram per square inch of enameled panel (and usually a weight loss of less than 0.1 gram). As a comparison, a good commercial low-temperature maturing, phosphate-base, lead-free enamel which was tested had a maturing temperature of 540° C. and a coefficient of thermal expansion between 50 and 350° C. of $15\times10^{-6}$ but had a weight loss of 0.75 gram as measured by the Sweo acid test.

Barium oxide when present in our compositions functions in some manner with the other components to impart to the total composition an outstanding resistance to attack by alkaline agents. However, excellent resistance to attack by alkalies is also manifested by compositions hereof having also an exceptionally high resistance to attack by acidic agents. Such compositions have amounts of zirconium oxide and titanium oxide approaching the maximum amounts permissible according to Tables A and B. Compositions 11, 12, 13, and 14 are illustrative of preferred compositions which have exceptional acid resistance as well as excellent alkali resistance but which do not contain barium oxide. Higher alkali resistance in our enamels is obtained in compositions having a content of barium oxide of at least approximately 3 cationic mol percent. If such an amount of barium oxide is employed in our compositions with at least 6 cationic mol percent of zirconium oxide and titanium oxide, and if the compositional ingredients are kept within the ranges set forth in Table B, enamels are obtainable which not only possess an outstanding acid resistance, i. e., a weight loss of less than approximately 0.1 gram according to the Sweo acid test, but also exceptional alkali resistance, i. e., a weight loss of less than 0.2 gram according to the Sweo alkali test. Examples 5, 7, 9, and 15 illustrate such compositions. Example 5, however, has a maturing temperature above the preferred range and for that reason does not have the versatility of use found for the other compositions.

In our preferred enameling frits the cationic mol percent of $AlO_{1.5}$ in the frit is maintained not in excess of approximately one-half the cationic mol percent of $PO_{2.5}$ in the composition. The amount of $AlO_{1.5}$ may be varied slightly in excess of this relationship in our less preferred compositions, i. e., up to approximately three-fifths the cationic mol percent quantity of $PO_{2.5}$ in the composition, while still providing useful compositions for less rigid requirements. The cationic mol quantity of $KO_{0.5}$ flux in our compositions is maintained preferably somewhat below the cationic mol quantity of $AlO_{1.5}$ present therein, but may be up to a quantity substantially the same as that of the $AlO_{1.5}$.

It is, of course, true that quantities of opacifying, dispersing, and coloring agents may be employed with our compositions to achieve results well known to the art and for that reason it is not essential that the matured enamel obtained by using our enameling frits be transparent. It is essential, however, that a quantity of titania and zirconia within the cationic mol percent range specified for our compositions be present in the form of a glass in order for the resulting matured enamel to exhibit such properties as the required chemical resistivity. In our frit compositions, prepared by melting the constituents of the frit into a homogeneous fluid mass at temperatures on the order of 1100° C., the behavior of titanium and zirconium oxides in the compositions during the enameling cycle at temperatures below 600° C. is such that the aforementioned results are obtained.

While we have described our compositions with particular reference to use on surfaces of aluminum and alloys thereof, it will be understood that the compositions may be used on a wide variety of surfaces, including those of other metals and alloys as well as those of ceramic, with equivalent results.

The foregoing description taken with the illustrative examples is intended to disclose this invention to those practicing this art but is not meant to be limitative of the scope thereof.

What we claim is:

1. An enameling frit maturable at temperatures below approximately 600° C., said frit consisting essentially of between 10 and 25 cationic mol percent of refractory glassformers, between 35 and 50 cationic mol percent of non-refractory glassformers of which at least about one-half is $PO_{2.5}$, said total amount of $PO_{2.5}$ being at least as great as the total of all said refractory glassformers and between 25 and 55 cationic mol percent of alkali and alkaline earth fluxes, said refractory glassformers consisting essentially of the following constituents with approximate amounts specified in cationic mol percent:

| | |
|---|---|
| $ZrO_2$ | .5 to 5 |
| $TiO_2$ | 0 to 9 |
| $ZrO_2+TiO_2$ | 3 to 10 |
| $SiO_2$ | 0 to 5 |
| $AlO_{1.5}$ | 4 to 16 | said non-refractory glassformers consisting essentially of the following constituents with approximate amounts specified in cationic mol percent:

| | |
|---|---|
| $BO_{1.5}$ | 13 to 25 |
| $PO_{2.5}$ | 15 to 30 | and said fluxes consisting essentially of the following constituents with approximate amounts specified in cationic mol percent:

| | |
|---|---|
| $LiO_{0.5}$ | 7 to 20 |
| $KO_{0.5}$ | 3 to 15 |
| $NaO_{0.5}$ | 0 to 20 |
| CaO | 0 to 10 |
| BaO | 0 to 10 |
| CaO+BaO | 0 to 15 | said frit when matured into an enamel being characterized by an acid resistivity, as measured by the acid test herein identified involving exposing an enameled panel to a boiling solution of 6% by weight citric acid for 2½ hours, giving a weight loss of less than approximately 0.3 gram per square inch of enamel.

2. The composition of claim 1 in which oxygen is replaced by fluorine in an amount up to the equivalent of approximately 10 mol percent of oxygen.

3. The composition of claim 1 in which up to 7 cationic mol percent of adherence-promoting oxides but not more than 5 mol percent of any one adherence-promoting oxide is present, said oxides being selected from the group consisting of $FeO_{1.5}$, $CrO_{1.5}$, $SbO_{1.5}$, $CoO_{1.5}$, $TlO_{1.5}$, $BiO_{1.5}$, CdO, NiO, CuO, and $AgO_{0.5}$.

4. An enameling frit maturable at temperatures below approximately 560° C., said frit consisting essentially of between 15 and 22 cationic mol percent of refractory glassformers, between 36 and 46 cationic mol percent of non-refractory glassformers of which at least about one-half is $PO_{2.5}$, said total amount of $PO_{2.5}$ being at least as great as the total of all said refractory glassformers and between 30 and 45 cationic mol percent of alkali and alkaline earth fluxes, said refractory glassformers consisting essentially of the following constituents with approximate amounts specified in cationic mol percent:

| | |
|---|---|
| $ZrO_2$ | 1 to 5 |
| $TiO_2$ | 1 to 8 |
| $ZrO_2+TiO_2$ | 4.5 to 9 |
| $SiO_2$ | 0 to 3 |
| $AlO_{1.5}$ | 9 to 14 | said non-refractory glassformers consisting essentially of the following constituents with approximate amounts specified in cationic mol percent:

| | |
|---|---|
| $BO_{1.5}$ | 14 to 21 |
| $PO_{2.5}$ | 18 to 28 | and said fluxes consisting essentially of the following constituents with approximate amounts specified in cationic mol percent:

| | |
|---|---|
| $LiO_{0.5}$ | 10 to 15 |
| $KO_{0.5}$ | 5 to 12 |
| $NaO_{0.5}$ | 5 to 17 |
| CaO | 0 to 7 |
| BaO | 0 to 7 |
| CaO+BaO | 0 to 10 | said frit when matured into an enamel being characterized by an acid resistivity, as measured by the acid test herein identified involving exposing an enameled panel to a boiling solution of 6% by weight citric acid for 2½ hours, giving a weight loss of less than approximately 0.2 gram per square inch of enamel.

5. The composition of claim 4 in which oxygen is replaced by fluorine in an amount up to the equivalent of approximately 10 mol percent of oxygen.

6. The composition of claim 4 in which up to 7 cationic mol percent of adherence-promoting oxides but not more than 5 cationic mol percent of any one adherence-promoting oxide is present, said oxides selected from the group consisting of $FeO_{1.5}$, $CrO_{1.5}$, $SbO_{1.5}$, $CoO_{1.5}$, $TlO_{1.5}$, $BiO_{1.5}$, CdO, NiO, CuO, and $AgO_{0.5}$.

7. An enameling frit maturable at temperatures below approximately 560° C., said frit consisting essentially of between 15 and 22 cationic mol percent of refractory glassformers, between 36 and 46 cationic mol percent of non-refractory glassformers of which at least about one-half is $PO_{2.5}$, said total amount of $PO_{2.5}$ being at least as great as the total of all said refractory glassformers, and between 30 and 45 cationic mol percent of alkali and alkaline earth fluxes, said refractory glassformers consisting essentially of the following constituents with approximate amounts specified in cationic mol percent:

| | |
|---|---|
| $ZrO_2$ | 1 to 5 |
| $TiO_2$ | 1 to 8 |
| $ZrO_2+TiO_2$ | 6 to 9 |
| $SiO_2$ | 0 to 3 |
| $AlO_{1.5}$ | 9 to 14 | said non-refractory glassformers consisting essentially of the following constituents with approximate amounts specified in cationic mol percent:

| | |
|---|---|
| $BO_{1.5}$ | 14 to 21 |
| $PO_{2.5}$ | 18 to 28 | and said fluxes consisting essentially of the following constituents with approximate amounts specified in cationic mol percent:

| | |
|---|---|
| $LiO_{0.5}$ | 10 to 15 |
| $KO_{0.5}$ | 5 to 12 |
| $NaO_{0.5}$ | 5 to 17 |
| $CaO$ | 0 to 7 |
| $BaO$ | 3 to 7 |
| $CaO + BaO$ | 3 to 10 | said frit when matured into an enamel being characterized by a chemical resistivity, as measured by tests herein defined, giving a weight loss of less than approximately 0.1 gram per square inch of enamel according to the acid test and a weight loss of less than approximately 0.2 gram per square inch of enamel according to the alkali test, said acid test as herein defined involving exposing an enameled panel to a boiling solution of 6% by weight citric acid for 2½ hours and said alkali test as herein defined involving exposing an enameled panel to a boiling solution of 5% by weight hydrated sodium pyrophosphate for 2½ hours.

8. The composition of claim 7 in which oxygen is replaced by fluorine in an amount up to the equivalent of approximately 10 mol percent of oxygen.

9. The composition of claim 7 in which up to 7 cationic mol percent of adherence-promoting oxides but not more than 5 cationic mol percent of any one adherence-promoting oxide is present, said oxides selected from the group consisting of $FeO_{1.5}$, $CrO_{1.5}$, $SbO_{1.5}$, $CoO_{1.5}$, $TlO_{1.5}$, $BiO_{1.5}$, $CdO$, $NiO$, $CuO$, and $AgO_{0.5}$.

10. A porcelain enamel having a high coefficient of thermal expansion and made by fusing at temperatures below 600° C. a uniform coating of an enameling slip composition formed from an enameling frit composition as identified in claim 1.

11. A porcelain enamel having a high coefficient of thermal expansion and made by fusing at temperatures below 560° C. a uniform coating of an enameling slip composition formed from an enameling frit composition as identified in claim 4.

12. A porcelain enamel having a high coefficient of thermal expansion and made by fusing at temperatures below 560° C. a uniform coating of an enameling slip composition formed from an enameling frit composition as identified in claim 7.

References Cited in the file of this patent

FOREIGN PATENTS

| | | |
|---|---|---|
| 633,178 | Great Britain | 1949 |

UNITED STATES PATENT OFFICE

CERTIFICATE OF CORRECTION

Patent No. 2,800,414                                             July 23, 1957

Norman H. Stradley et al.

It is hereby certified that error appears in the printed specification of the above numbered patent requiring correction and that the said Letters Patent should read as corrected below.

Column 2, line 36, for "glassmakers" read -- glassformers --; column 5, line 26, for "Highter" read -- Higher --; column 7, line 49, after "one-half" insert -- is --.

Signed and sealed this 15th day of October 1957.

(SEAL)

Attest:

KARL H. AXLINE
Attesting Officer

ROBERT C. WATSON
Commissioner of Patents